Aug. 8, 1933.   F. W. HORSTKOTTE   1,921,569
SAWMILL
Filed April 29, 1931   5 Sheets-Sheet 1
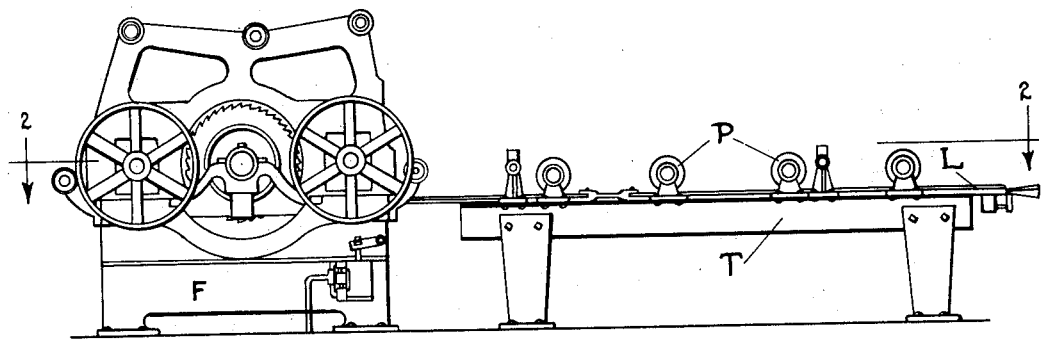
Fig.1
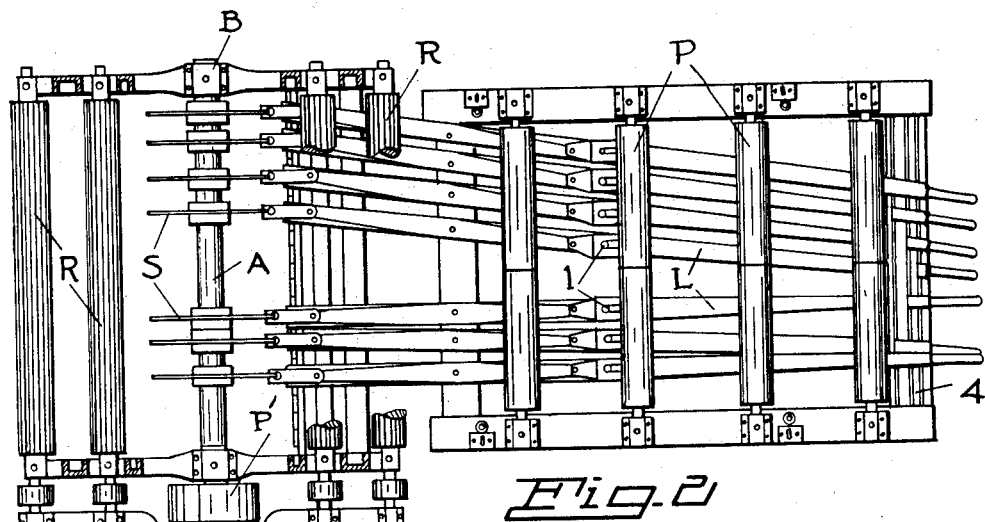
Fig.2
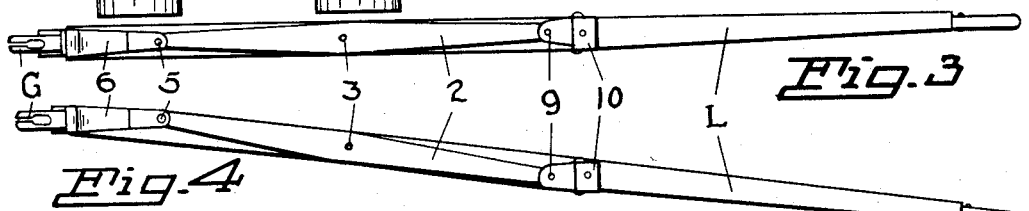
Fig.3
Fig.4
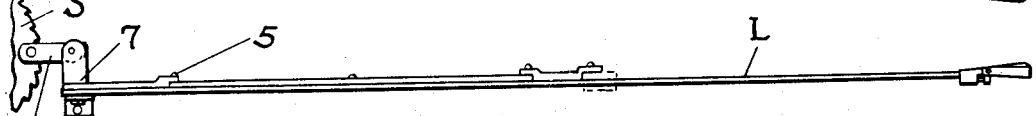
Fig.5
FRED. W. HORSTKOTTE
Inventor
By Herbert E. Smith
Attorney Aug. 8, 1933.                F. W. HORSTKOTTE                    1,921,569
                                  SAWMILL
                         Filed April 29, 1931           5 Sheets-Sheet 2
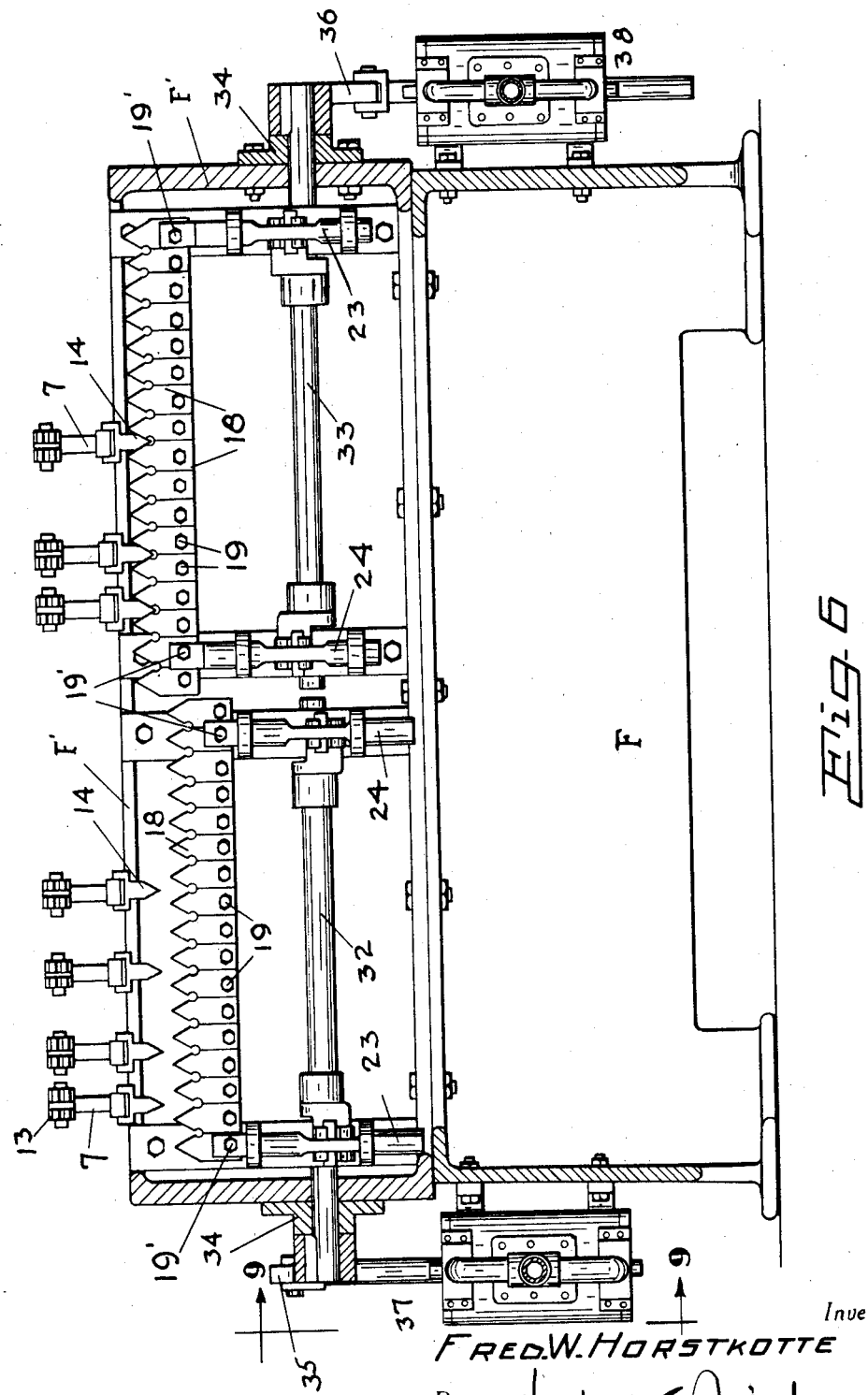
Inventor
FRED.W.HORSTKOTTE
By       Herbert E. Smith
                         Attorney

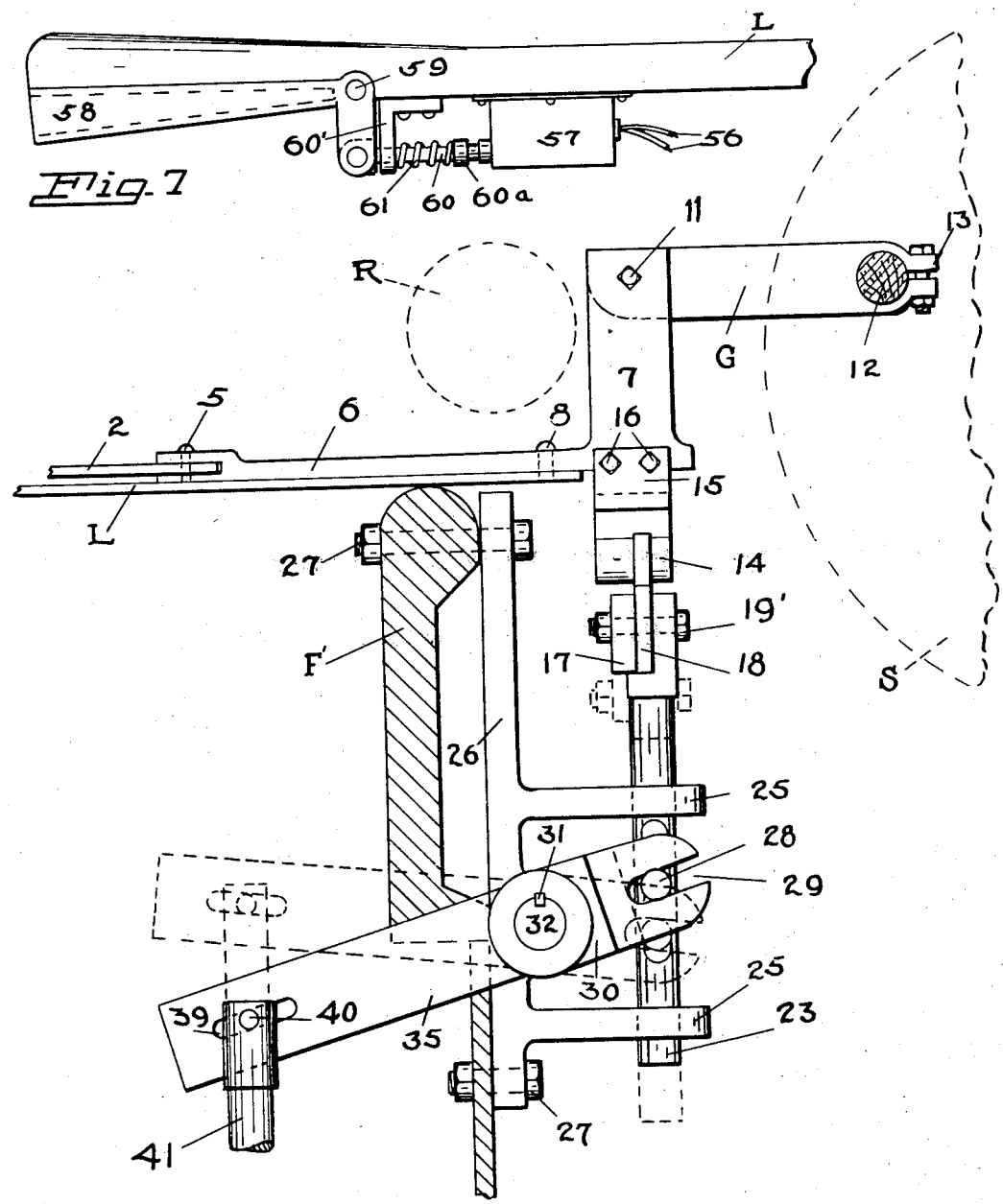

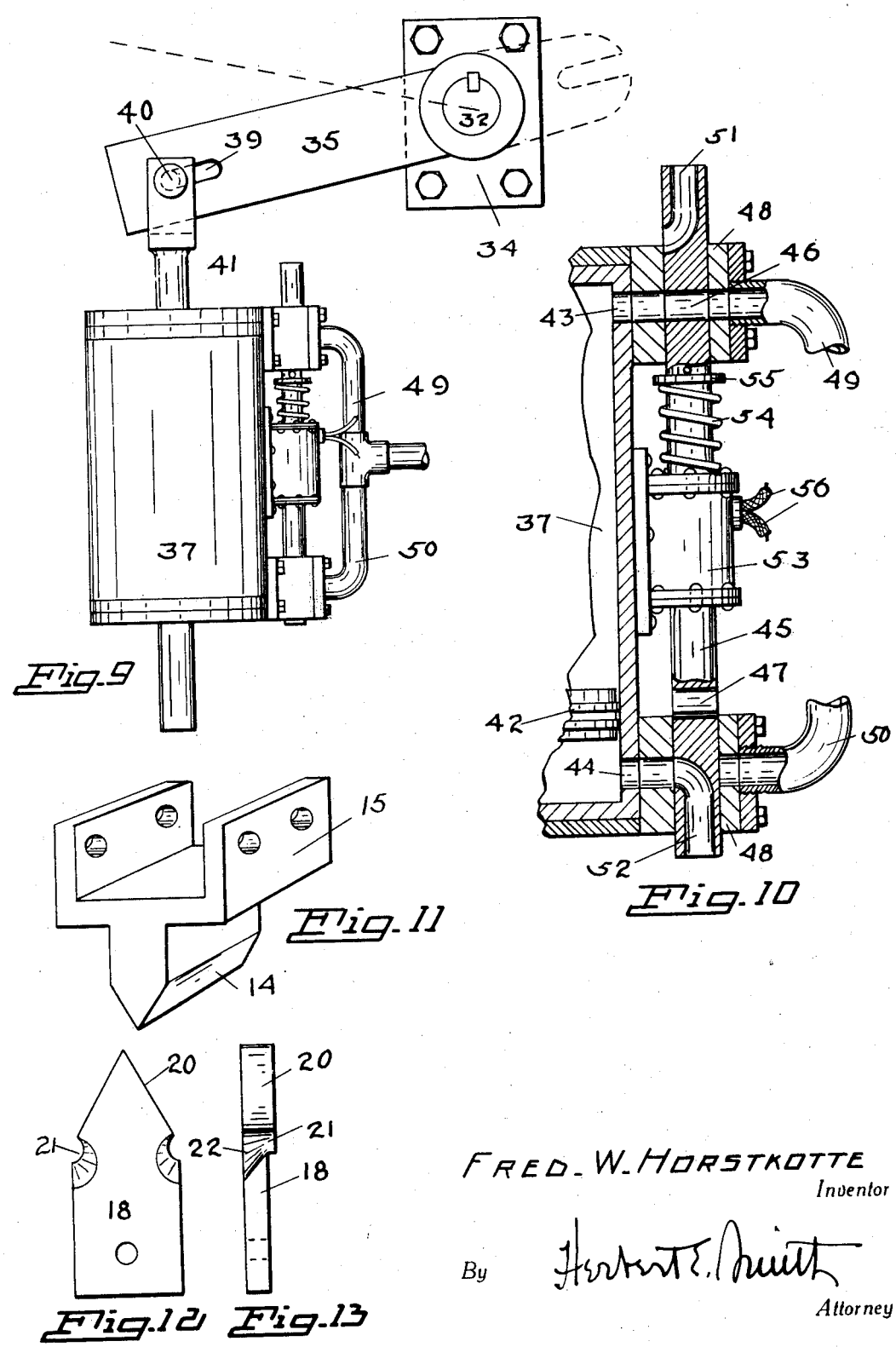

Aug. 8, 1933.   F. W. HORSTKOTTE   1,921,569
SAWMILL
Filed April 29, 1931   5 Sheets-Sheet 5

FRED. W. HORSTKOTTE
Inventor

By *Herbert K. Smith*

Attorney

Patented Aug. 8, 1933

1,921,569

UNITED STATES PATENT OFFICE 1,921,569

SAWMILL

Frederick W. Horstkotte, Portland, Oreg.

Application April 29, 1931. Serial No. 533,625

4 Claims. (Cl. 143—37)

My present invention relates to improvements in saw mills or sawing machines of the edger type employing a gang or sets of rotary saws mounted on an arbor, and particularly to the means for adjusting to exact position and locking the saws in their selected and predetermined positions. In machines of the edger type a gang of rotary saws are mounted on an arbor that extends transversely of the machine, and each saw is provided with a guide that is utilized for shifting the saw laterally, and along the axial or longitudinal line of the arbor. Each saw and its guide is equipped with a pivoted shifting lever on the end of which the guide is mounted, and the levers are manipulated by the edgerman for shifting the saws in selected positions for cutting the lumber that is fed longitudinally through the machine.

For efficiency, accuracy, and reliability, in the operation of the saws, it is essential that the saws and their guides shall be positively and rigidly held in selected position with relation to the lumber and the board being cut therefrom, and to insure these results I have invented an exact adjusting and locking mechanism controlled from the handle of the edger lever involving the use of locking teeth on the shifting levers which co-act with complementary notch-bars located adjacent the saws for the exact adjustment of and locking the saw guides.

The notch-bars extend transversely of the sawing machine, and the notches of the bars are spaced predetermined distances apart corresponding to a predetermined scale of dimensions for cuts in the lumber. The saw guides, on which are mounted the locking teeth, may be shifted with relation to the stationary notch bar to insure cuts of the saws within the range of the predetermined scale.

The invention consists in certain novel combinations and arrangements of parts as will hereinafter be more fully pointed out and claimed. In the accompanying drawings I have illustrated one complete example of the physical embodiment of my invention wherein the parts are combined and arranged and embodied with a vertically reciprocable notch-bar, and in addition to this exemplification of the invention I illustrate a modified form of rotary notch-bar. But it will be understood that other changes and alterations may be made in the exemplified structures within the scope of my claims, and without departing from the principles of my invention. Claims involving the combination of manually operated means for securing a "rough" adjustment of the saw and power operated means for securing an additional and precise adjustment and locking of the saw, and claims to a specific rotary means for accomplishing the precise adjustment and locking, are now pending in my application for Patent Ser. No. 648,684 filed December 23, 1932.

In the accompanying drawings:

Figure 1 is a view in side elevation of an edger equipped with the locking device of my invention.

Figure 2 is a plan view of the edger of Figure 1 showing the rotary saws in a gang of seven, with the front feed rolls broken away for convenience of illustration, and illustrating the relative arrangement of the shifting levers.

Figures 3 and 4 are plan views of two shifting levers, in different positions, and Figure 5 is an edge view of one of the levers showing a saw guide mounted on one end thereof, and indicating the relation of the saw.

Figure 6 is a vertical, transverse sectional view of the sawing machine, looking toward the front end, showing duplex locking devices for two sets of the seven rotary saws, with their operating means, the notch-bar at the left being lowered to release the saw guides, and the locking mechanism at the right in elevated position to lock the three saw guides in selected position.

Figure 7 is a side view at the free end of one of the shifting levers, showing the hand-grip for the edgerman employed for controlling the electrically operated mechanism of the notch-bars.

Figure 8 is an enlarged detail view showing one end of the locking mechanism, with the saw guide in locked position, and indicating by dotted lines the release position of the notch-bar.

Figure 9 is a view showing the electrically controlled air-motor for operating the notch-bar, as at line 9—9 of Figure 6.

Figure 10 is an enlarged sectional detail of the valve mechanism of the air motor with its electrical control.

Figure 11 is a perspective view of one of the locking teeth detached from the saw-guide.

Figures 12 and 13 are respectively a face view and an edge view of one of the notch-blocks that are mounted on the notch-bar to form the notches for co-action with the teeth of Figure 11.

Figure 14:
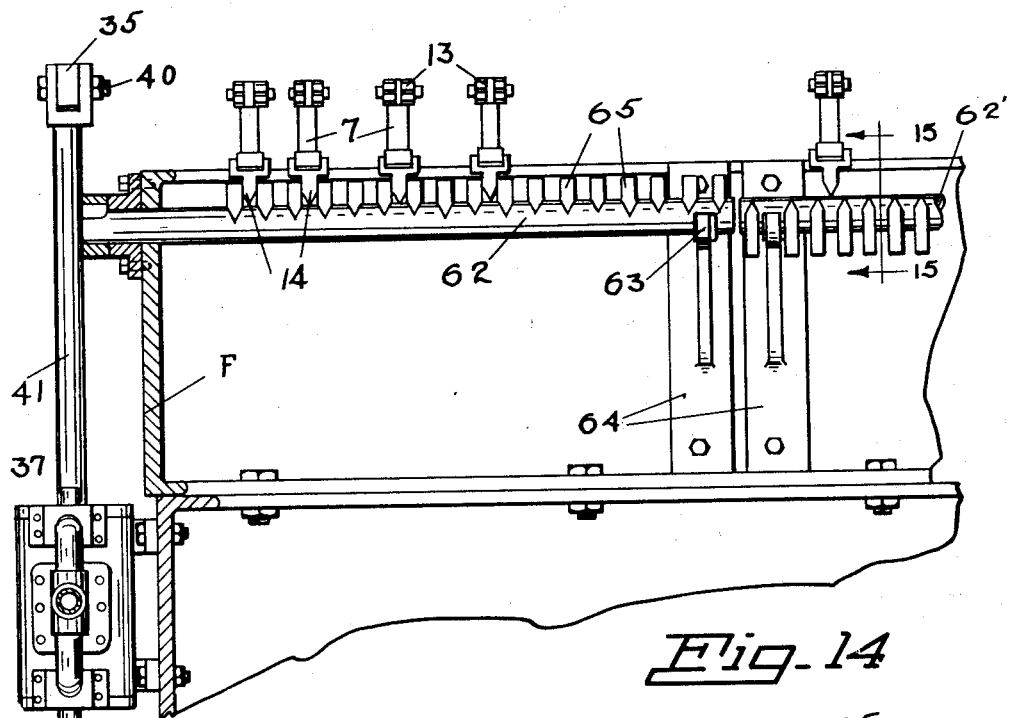
Figure 14 is a broken view, similar to Figure 6, but showing a modified form of duplex, rotary, notch-bars, the bar at the left being shown in locked position with four saw guides and the bar at the right being shown in open position, or freed from one of the saw guides.

In the assembly views of Figures 1 and 2 I have indicated the general arrangement of parts, including the gang of seven rotary saws S that are shiftable laterally on the arbor A which is provided with the usual driving pulley P', the shaft or arbor being journaled in bearings B of the frame F. The lumber is fed longitudinally through the machine by the fluted feed rolls R and the pipe rolls or press rolls P mounted on the table T, the side guides for the boards or lumber being omitted, and two of the feed rolls being broken away for convenience of illustration.

Each saw is provided with a guide G, and each guide is equipped with a shifting lever L that extends from the saw end of the machine to the front end where the edgerman is stationed, and the levers are manipulated by the edgerman to effect selected cuts of material from the lumber and to control the exact adjustment of and locking of the saws.

Each lever L is pivoted at 1 on the table T, and is provided with the auxiliary lever 2, centrally pivoted at 3 on the main lever, and the latter at its saw end rests upon the frame F' while its front free end rests upon a cross bar 4, a number of the supporting bars being shown in Figure 2.

At the saw end of the lever L the auxiliary lever 2 is pivotally connected at 5 to a horizontal arm 6 of the upright guide carrier or post 7, and the arm 6 is pivoted at 8 on the end of the main lever L. At the front end of the auxiliary lever a pivotal connection is made at 9 in the stationary bracket 10 secured to the frame of the table T. The seven saw-shifting levers L are disposed in usual position, longitudinally of the table, and they are manipulated by the edgerman in customary way for shifting the respective saws of the gang.

Each saw is equipped with a guide G that is pivotally mounted at 11 in the top of the guide carrier in order that the guide may be turned to upright position if and when necessary to gain access to the saw.

The free end of the guide G is bifurcated to form jaws and each jaw is equipped with guide pins as 12, fashioned from lignum vitæ or other suitable material for contact with the opposite sides of the saw, when the latter is being shifted laterally on its arbor A. The split jaws, as seen in Figure 8 are clamped at 13 to secure the guide pins in place and to readily permit releasing of the pins when replacement or adjustment is necessary.

At the lower end of each upright carrier 7 is mounted a downwardly projecting tooth 14 which is fashioned with attaching flanges 15 that are fitted up on the lower end of the carrier and securely fastened thereto at 16, as best seen in Figures 8 and 11.

These teeth 14 as shown are wedge shaped, and a tooth is employed for locking its guide carrier, guide, and saw in rigid position for the operation of the saw. The teeth are located directly above and for co-action with a notch-bar that is vertically reciprocable for engagement with the teeth 14 to lock the guides and their saws, and for releasing the teeth to permit lateral shifting of the guides and saws by the manipulation of the shifting levers L.

In Figure 6 a pair of duplicate, or duplex, locking mechanisms are illustrated, extending transversely across the machine for co-action with the seven teeth of the saw guides, and duplex motors are illustrated for raising and lowering the reciprocating parts of the locking mechanisms.

Each of the reciprocable locking devices comprises a flat bar, as 17, standing on edge, and to which plates or blocks 18 are bolted as at 19. The blocks are secured edge to edge, and their upper ends 20 are pointed or tapered, complementary to the wedge shaped teeth 14, to form spaced notches between adjoining points 20, for the reception of the teeth 14. The blocks are fashioned with edge grooves 21 and bevel faces 22 that form discharge notches, to clear the tooth-notches occurring between the points 20, of saw dust, and thus prevent clogging of the notch-bar.

The notch-bars are supported at their outer ends by two spaced lifting-pins 23 and 24, the bars being bolted at their ends to the upper ends of the pins, as at 19', and these lifting pins are vertically reciprocable in the spaced bearing arms 25 of the brackets 26, the brackets being bolted at 27 to the frame bar F'.

Each of the four lifting pins is provided with a pair of transversely extending trunnions 28 located between the bearing arms 25 in which the pins slide, and these trunnions co-act with the slotted jaws 29 of the lifting levers 30 that are keyed at 31 near the opposite ends of the two rock shafts 32 and 33. The bifurcated heads or slotted jaws 29 of the lifting levers straddle the trunnions with a comparatively loose joint, and the lifting levers co-act with the trunnions to raise and lower the notch-bars, as the rock shafts 32 and 33 are rocked or turned in their bearings 34. The rock shafts 32 and 33 extend transversely of the edger, and as shown in Figure 6 the shaft 32 has been rocked to lower the notch-bar from the set of four locking teeth 14 to permit shifting of the four saws, while the shaft 33 has been rocked in its journal bearings to lift its notch-bar into locking engagement with the set of three locking teeth 14 at the right side of the machine, thereby positively locking the three saw guides and their saws in rigid position for sawing.

These shafts 32 and 33 are rocked through the instrumentality of rigidly mounted rocker arms 35 and 36 keyed on the outer ends of the shafts, and these rocker arms are raised and lowered by means of two pneumatic motors indicated as 37 and 38 and supported at the outer, opposite sides of the table T. The motors shown and described are reciprocating, pneumatic motors, but it will be understood that motors employing other motive fluid may be substituted, or other suitable motors may be connected to rock the shafts 32 and 33.

In converting the reciprocating movement of the air motor to the rocking or rotary movement of the rocker arms, the latter are slotted at 39, near their free ends, to receive the pivot pin or coupling pin 40 passed transversely through the bifurcated upper end of the piston stem 41. The piston stem reciprocates in the cylinder of the motor and is provided with a piston-head 42 against which air under pressure is applied from the two inlet ports 43 and 44 at the opposite ends of the motor cylinder.

Ingress and egress of air through these ports are controlled by the slide valve 45 located exterior of the cylinder, and movement of this valve is controlled by electrically controlled means to be described.

As best seen in Figure 10 the slide valve has transversely extending ports 46 and 47 adapted to register with the respective valve ports or cylinder ports 43 and 44 respectively, and the valve-stem slides in the spaced bearing-cases 48, 48 secured at the upper and lower ends of the cylinder. A main air pipe is fashioned with branch pipes 49 and 50 for alternate introduction of air under pressure to the cylinder, and at the opposite ends of the slide valve are provided exhaust or outlet ports 51 and 52 for venting the interior of the cylinder at opposite sides of the piston.

In Figure 10 it will be apparent that air under pressure passing through branch pipe 49, port 46 and port 43 into the motor cylinder has forced the piston down to the position indicated, the lower end of the cylinder being vented through ports 44 and 52. This movement of the piston and its stem has rocked the rocker arm 35 to the position of Figure 9 and elevated or raised the notch-bar into engagement with the locking teeth of the saw guides. To release these saw guides, the slide valve is shifted to introduce air under pressure through pipe 50, port 47 and port 44 to the interior of the motor cylinder, under the piston 42, and the vent port 51 is made to register with port 43, while port 46 is disconnected from the pipe 49 and the latter is closed. The piston is lifted by the motive pressure and the notch-bar is disengaged from the locking teeth.

Thus positively acting means are employed for locking and releasing the notch bars and the locking teeth of the saw guides, and it will be apparent that, in the locking movement, the tooth 14, of wedge shape, is guided accurately into the complementary wedge shaped or V-shaped notch of the notch-bar. The bevelled edges of the tooth frictionally engage the complementary walls of the notches, with a fit that renders the joint a rigid one, and it will be apparent that the formation of the frictionally engaging faces of the tooth and notch compensates for wear on the teeth 14 and points 20, thus insuring at all times a rigid and positive locking connection between the saw guide and the notch-bar. The air pressure holds the notch-bar up in its locked position, and the notch-bar cannot be released except by operation of the slide valve.

The slide valve is operated by means of a solenoid magnet 53 that is mounted on the exterior of the motor cylinder, and the slide valve, which is mounted in and passes through the magnet, forms the core of the solenoid. A spring 54, coiled about the slide valve, is interposed between an adjustable collar 55 fixed on the slide valve, and the magnet 53, to normally urge the slide valve 45 downwardly, and when the magnet is de-energized, this spring performs its function, and lowers the slide valve for releasing the notch bars from the teeth of the saw guides.

The solenoid magnet is energized to lift the slide valve through current provided by the wires 56, and a pair of these wires leads to each of the shifting levers L. Each shifting lever L has a switch box 57 secured at its underside near its free end and a circuit maker located within the box is operated by the edgerman before he shifts the saws. The wires 56 provide for the electrical connection between the solenoid magnet and the seven switch boxes, and each shifting lever L has mounted at its free end a hand-grip 58 that is grasped by the edgerman. The hand-grip is of angular shape and pivoted at 59 on the lever, and the grip has a pivotally connected pin 60 that extends into the switch box 57 to perform the functions of a push button for the circuit maker. A spring 61 on the pull pin 60 is interposed between the supporting bracket 60' for the pin and a collar 60a on the pull pin, to normally hold the switch open, and to swing the hand-grip away from the lever L.

Figure 16:
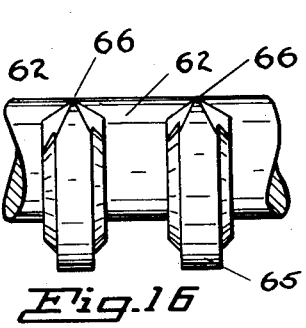
Figure 16 is a view at line 16—16 of Figure 15 showing two integral lugs or notch-blocks on the rock shaft or rotary notch-bar.
Figure 17:
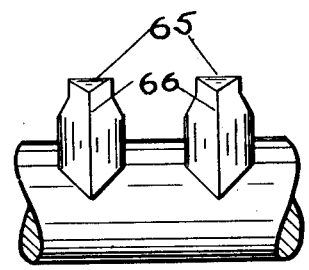
Figure 17 is a view as at line 17—17 of Figure 15 with the rock shaft or notch-bar turned upward to locking position.
Figure 18:
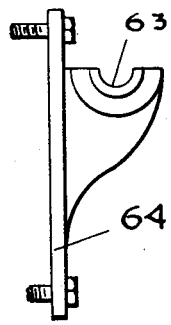
Figure 18 is a detail side view of one of the bearings for the rocking bar or shaft.

In the modified form of the invention disclosed in Figures 14 through 18, a rotary, or rocking, notch-bar, is substituted for the vertically reciprocating bars heretofore described, and two of these rocking notch-bars, as 62 and 62' are illustrated for use with the seven locking teeth 14 of the saw guides. These rocking notch-bars are journalled in bearings 63 of the frame F', the bearings being of suitable construction and provided with attaching plates as 64 (Fig. 18).

Figure 15:
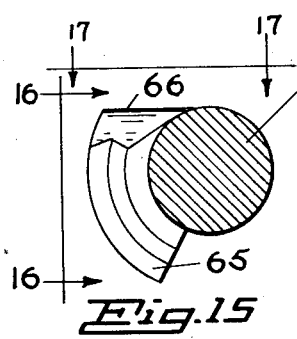
Figure 15 is a sectional view at line 15—15 of Figure 14.

The rocking notch-bars may be of solid cylindrical construction and they are each provided with spaced lugs 65 that form notches between them into which the teeth 14 of the guide carrier fit. The lugs, as seen in Figure 15, are arcuate or segmental in shape, and they extend less than half way around the notch bar, in order that when the bar, as 62, is rocked or turned through the instrumentality of the motor 37, and its connections indicated in Figure 14, the lugs will be engaged with or disengaged from the teeth. In Figures 14 (at the left) and 17 of the notch bars are rocked or turned to bring the lugs in locking position, while in Figure 14 (at the right) and Figure 16, the bars have been rocked to release the teeth.

These lugs, as indicated in Figures 15, 16, 17 are provided with wedge shaped points 66, and it will be apparent that the wedge shaped teeth 14 frictionally engage the bevelled faces of these wedge shaped points to bring the teeth into exact alinement with the notch-bar.

Thus, it will be apparent that the edgerman is required merely to bring the saw guide into approximately correct position as he manually shifts the guide, and then, in both of the described forms of my invention, by the use of the co-acting bevelled edges of the locking parts the saw guide is positively and accurately placed in the correct position and then securely locked in that position. This automatic setting and locking of the saw guide relieves the edgerman of the more precise adjustments and therefore saves time in the shifting operations of the saws; and the positive action of the locking mechanism in holding the saw guide in rigid position eliminates the effects (that would otherwise be detrimental) of any loose joints due to wear in the pivotal and relatively movable parts of the shifting and locking mechanisms.

In the edgers with which I am familiar, the number of joints between the locking means of the saw guide and the guide pins of the saw guide, which pins engage the opposite sides of the saw, are all subject to wear, and if compensation is not made for this wear, a precise cut is impossible for the board. By the use of the proximate, manual adjustment, and the automatic rectifying thereafter of the saw guides, together with the rigid locking of the guides, compensation is made for any wear in the various parts that may occur, and the successive boards are ripped with exact precision in similar dimensions.

I find that an edger provided with the locking mechanism of my invention economizes in time, material, and labor, as compared with other edging machines, better edging of the lumber is accomplished, and a larger return from the log is procured due to the precision with which the cuts are made.

Having thus fully described my invention, what I claim as new and desire to secure by Letters Patent is:

1. In a locking mechanism for a saw guide, the combination with a plurality of laterally adjustable carriers each having a wedge-shaped tooth thereon, of a vertically reciprocable bar and means for reciprocating said bar, said bar having mounted thereon a plurality of blocks, and said blocks having tapered points forming complementary notches for engagement with selected teeth.

2. In a locking mechanism for a saw guide, the combination with a laterally adjustable guide-carrier having a locking tooth thereon, of a vertically reciprocable notch-bar for co-action with the locking tooth, a pair of lifting pins rigid with the bar, a rocking member operatively connected to said pins, and means for rocking said member.

3. In a locking mechanism for a saw guide, the combination with a laterally adjustable guide-carrier having a locking tooth thereon, of a vertically reciprocable notch-bar for engagement with said tooth, a pair of slidable lifting pins rigid with the bar, a rock shaft and operating means therefor, and lifting arms on said rock shaft in operative engagement with said lifting pins.

4. In a locking mechanism for a saw-guide-carrier having a locking tooth, the combination of a notch-bar for engagement with the tooth, lifting pins rigid with said bar, trunnions on the pins, a rock shaft and operating means therefor, and slotted lifting levers on the shaft having operative engagement with said trunnions.

FREDERICK W. HORSTKOTTE.